United States Patent [19]
Haden

[11] 3,865,201
[45] Feb. 11, 1975

[54] ACOUSTIC EMISSION IN DRILLING WELLS

[75] Inventor: Elard L. Haden, Ponca City, Okla.

[73] Assignee: Continental Oil Company, Ponca City, Okla.

[22] Filed: Jan. 4, 1974

[21] Appl. No.: 430,863

[52] U.S. Cl............ 175/50, 73/151, 166/250, 181/.5 BE
[51] Int. Cl............................... E21b 49/00
[58] Field of Search....... 175/50, 45, 40; 181/.5 BE; 73/151; 166/250

[56] References Cited
UNITED STATES PATENTS

| | | | |
|---|---|---|---|
| 3,047,794 | 7/1962 | Bennett et al. | 175/50 X |
| 3,235,026 | 2/1966 | Hottman et al. | 181/.5 |
| 3,315,224 | 4/1967 | Ferguson | 73/151 X |
| 3,382,933 | 5/1968 | Hottman | 175/50 |
| 3,520,375 | 7/1970 | Raynal et al. | 175/50 X |
| 3,739,871 | 6/1973 | Bailey | 166/250 X |
| 3,817,345 | 6/1974 | Bailey | 73/151 X |

Primary Examiner—Frank L. Abbott
Assistant Examiner—Richard E. Favreau
Attorney, Agent, or Firm—Gerald L. Floyd

[57] ABSTRACT

Method of drilling a well in subterranean strata having an uneven fluid pressure distribution comprising periodically stopping drilling, observing the acoustic emission characteristics of the formation rock in the vicinity of the drill bit, and adjusting the weight of the drilling fluid to balance the formation pressure as expressed by the acoustic emission characteristics.

5 Claims, 2 Drawing Figures

3,865,201

TOTAL ACOUSTIC EMISSION COUNTS-1,000 COUNTS

3,865,201

ACOUSTIC EMISSION IN DRILLING WELLS

BACKGROUND OF THE INVENTION a. Field of the Invention

This invention involves a method for drilling a well through abnormally pressured formations. More particularly the invention involves a method of detecting such abnormally pressured formations so that the weight of the drilling fluid can be balanced thereagainst to prevent a blowout or formation breakdown.

b. Description of the Prior Art

When a well is drilled, normal pressures, i.e., hydrostatic pressures, exist to some unknown depth where transition to abnormal pressures might be encountered. In the normally pressured zones, formation pressure increases at a constant rate with increasing depth. This rate of increase is approximately 0.465 pounds per square inch per foot of depth, and is the equivalent to the pressure exerted at the base of a column of water containing 80,000 ppm total solids. Abnormal pressures either are less than (underpressured) or greater than (geopressured) this pressure gradient of 0.465 psi/ft. In many geographical areas, such as the Gulf Coast of the United States, geopressures are encountered. Underpressures have been found in areas of oil and/or gas production where pressure in the formations is depleted through the years by production.

In drilling wells it is necessary to balance the weight of the drilling fluid against the formation pressure. If the formation pressure becomes substantially greater than the weight of the column of drilling fluid there is danger that the fluid in the formation, i.e., oil, gas and/or water, will flow into the wellbore and possibly cause a catastrophic "blowout" or drill string sticking. If the formation pressure becomes substantially less than the weight of the column of drilling fluid there is danger that the formation will break down, drilling fluid will flow into the formation and be lost and circulation of the drilling fluid which is essential to the drilling process cannot be maintained. The fastest and most efficient drilling rates are obtained when a slight overbalance of drilling fluid pressure to formation pressure is maintained. The penetration rate of the drill bit begins to decrease dramatically when overbalances exceed about 300 psi more than formation pressures at 10,000 to 12,000 feet of depth. This is only about 0.5 pound per gallon excess mud weight. It can be seen that balancing the drilling fluid pressure against the formation pressure is relatively easy and can be calculated in normally pressured formations where the rate of pressure increase with depth is known. However, a satisfactory method of such balancing in abnormally pressured formations has not been readily available.

It is an object of this invention to provide a method for balancing the weight of a column of drilling fluid against formation pressure in abnormally pressured formations.

It is a further object to determine any unbalance of drilling fluid pressure and formation pressure without substantial interruption of the drilling process.

It is another object to drill geopressured formations without danger of a blowout. It is still another object to keep drilling fluid weights at a safe minimum during drilling so that loss of circulation does not occur. Other objects, advantages and features of this invention will become obvious from the following specification, drawings and appended claims.

BRIEF SUMMARY OF THE INVENTION

This invention involves a method of drilling a well in subterranean strata having zones of abnormal formation pressure comprising:
a. momentarily ceasing drilling operations,
b. determining the acoustic emission characteristics of the formation rock in the vicinity of the drill bit,
c. adjusting the weight of the column of drilling fluid when such determination indicates that the drilling fluid pressure and formation pressure are out of balance, and
d. resuming drilling operations.

DESCRIPTION OF THE PREFERRED EMBODIMENT

The drilling fluid used in this process may be an aqueous or oil base drilling mud, air or mist. Where a drilling mud is used, the pressure of the column of drilling mud against the formation is increased by increasing the density of the drilling mud as by adding to the mud barium sulfate or some other weighting agent. If air or mist drilling is being employed, the pressure is increased by increasing the amount of air being compressed.

When solid materials, such as formation rocks, undergo plastic deformation and fracture, energy is released. Part of this energy is converted into transient vibrations which are referred to as acoustic emissions. In a non-homogeneous material, such as a rock, both the stress field and the strength will vary within the material so that unstable conditions will develop locally long before the whole mass of material becomes unstable. These conditions will result in local dynamic movement, such as the movement on a dislocation, the propagation of a Luders band, intergranular slip or the propagation of a crack. Thus when the drilling fluid pressure beings to get out of balance against the formation pressure, the formation rock begins to undergo plastic deformation and fracture and emits a substantial number of acoustic emissions. When the two are in balance there are relatively few acoustic emissions from the rock.

The acoustic emission characteristics of the formation rock can be monitored by counting the total number of acoustic emissions over a given time period.

Figure 1:
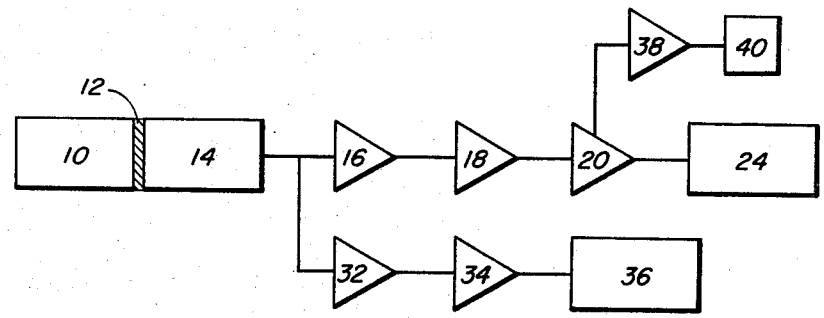
FIG. 1 is a schematic block diagram of the apparatus used to determine the acoustic emission characteristics of the formation rock.

Referring to FIG. 1, the process of the invention is carried out by coupling an acoustic energy sensor such as electrodynamic transducer or piezoelectric accelerometer 14 to formation rock 10 with coupling fluid 12 such as the drilling fluid. Transducer 14 is conveniently mounted on the drill collar above the drill bit (not shown) and periodically moved into contact with formation rock 10 when the drilling operation is momentarily interrupted, as when an additional length of drill pipe is added to the drilling string at the surface of the well. As soon as the acoustic emissions have been monitored, transducer 10 is moved back out of contact with formation rock 10 and the drilling operation began again. The low level electrical signals generated by the transducer are passed up to the surface of the well and then through filter band pass 16, preamplifier 18 and amplifier 20. The extraneous noises due to sources other than the acoustic emission, such as the equipment in the well, electrical noise from operating equipment and the like, have frequencies less than 25 kilohertz. Therefore, the frequency selected for detection is normally quite high, e.g. 50 kilohertz to 3M hertz. The narrow filter band pass 16 increases the signal-to-noise ratio. The resulting signal may be either audio or visually displayed. For audio display the signal may be passed through audio amplifier 38 and speaker 40. For visual display the signal may be passed to counter 24 which has a linear response over the required frequency range. Alternatively the signal from transducer 14 can be passed through power amplifier 32 and spectrum analyzer 34 and visually observed on oscilloscope 36.

Figure 2:
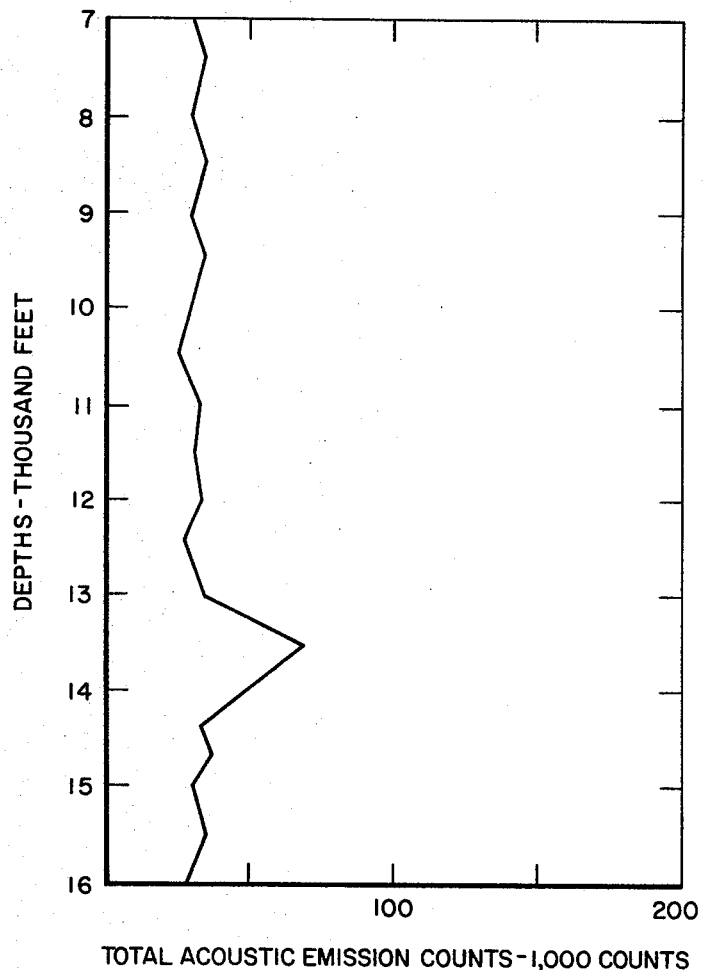
FIG. 2 is a graphical representation of the number of acoustic emission characteristics with depth.

FIG. 2 shows a typical plot wherein the total acoustic emission counts determined using the apparatus of FIG. 1 are plotted versus depth over an interval of a well being drilled in an area where geopressure are expected at a depth somewhat below 13,000 feet. At depths up to 13,000 feet the density of the aqueous drilling fluid is balanced against normal formation pressure using a pressure gradient of 0.465 psi per foot. The total acoustic emission counts from 7,000 feet to 13,000 feet is substantially the same indicating a satisfactory balance is being maintained. At 13,250 feet the total acoustic emission counts increase substantially. At 13,500 feet the increase is even greater indicating the start of plastic deformation of the rock, hence an imbalance between the drilling fluid pressure and the formation pressure. At this point the weight of the drilling fluid is raised 0.5 pound per gallon above what would be required to balance a normal formation pressure at this formation. At 13,750 feet the total acoustic emission counts decrease indicating that the two pressures are once again becoming balanced. At depths of 14,000 to the total depth of 16,000 feet the relatively constant total acoustic emission counts indicate that a proper pressure balance is being maintained.

The foregoing discussion and description have been made in connection with certain preferred specific embodiments of the process of this invention. However, it is to be understood that the discussion and description of the invention is only intended to illustrate and teach those skilled in the art how to practice the process and is not to unduly limit the scope of the invention which is defined and claimed hereafter.

I claim:

1. A method of drilling a well in a subterranean strata having zones of abnormal formation pressure comprising:
    a. momentarily ceasing drilling operations,
    b. determining the acoustic emission characteristics of the formation rock in the vicinity of the drill bit,
    c. adjusting the weight of the column of drilling fluid when such determination indicates that the drilling fluid pressure and formation pressure are out of balance, and
    d. resuming drilling operations.

2. The method of claim 1 wherein the determination of the acoustic emission characteristics is made while the drilling operation is stopped to add a length of drill pipe to the drill string.

3. The method of claim 1 wherein the acoustic emission characteristic determined is the total number of acoustic emissions.

4. The method of claim 1 wherein the acoustic emission characteristics are determined by a piezoelectric transducer mounted on the drill string near the drill bit.

5. The method of claim 1 wherein the adjustment of the weight of the column of drilling fluid is made when the acoustic emission characteristics increase.

* * * * *